(12) United States Patent
Bouchuiguir

(10) Patent No.: US 12,511,369 B2
(45) Date of Patent: Dec. 30, 2025

(54) METHOD OF AUTHENTIFICATION OF A CONSUMABLE FOR UES WITH AN AEROSOL- GENERATING DEVICE

(71) Applicant: JT International SA, Geneva (CH)

(72) Inventor: Layth Sliman Bouchuiguir, Bellevue (CH)

(73) Assignee: JT International SA (CH)

( * ) Notice: Subject to any disclaimer, the term of this patent is extended or adjusted under 35 U.S.C. 154(b) by 573 days.

(21) Appl. No.: 17/786,275

(22) PCT Filed: Dec. 16, 2020

(86) PCT No.: PCT/EP2020/086560
§ 371 (c)(1),
(2) Date: Jun. 16, 2022

(87) PCT Pub. No.: WO2021/122839
PCT Pub. Date: Jun. 24, 2021

(65) Prior Publication Data
US 2023/0025261 A1    Jan. 26, 2023

(30) Foreign Application Priority Data
Dec. 19, 2019    (EP) .................................... 19218335

(51) Int. Cl.
*G06F 21/44*    (2013.01)
*A24F 40/53*    (2020.01)
(Continued)

(52) U.S. Cl.
CPC .............. *G06F 21/44* (2013.01); *A24F 40/53* (2020.01); *A24F 40/60* (2020.01); *A24F 40/65* (2020.01); *G06Q 20/327* (2013.01)

(58) Field of Classification Search
CPC .......... A24F 40/53; A24F 40/60; A24F 40/65; G06F 21/44; G06Q 20/327
See application file for complete search history.

(56) References Cited

U.S. PATENT DOCUMENTS 9,864,947 B1    1/2018  Sur et al.
2016/0360789 A1*  12/2016  Hawes ................ H05B 1/0297
(Continued)

FOREIGN PATENT DOCUMENTS

CN    107018490 A    8/2017
CN    109952585 A    6/2019
(Continued)

OTHER PUBLICATIONS

International Search Report for PCT/EP2020/086560 dated Feb. 26, 2021. 3 pgs.
(Continued)

*Primary Examiner* — Omer S Khan
(74) *Attorney, Agent, or Firm* — Lerner David LLP

(57) ABSTRACT

A method of authenticating a consumable for use with an aerosol generating device includes initiating a communication between the aerosol generating device and a first entity to obtain the consumable from the first entity for use with the aerosol generating device, the aerosol generating device being associated with a device ID and the consumable being associated with a consumable ID; sending the device ID and the consumable ID from the first entity to a second entity, wherein the second entity is configured to associate and store the device ID with the consumable ID; and verifying use of the consumable with the aerosol generating device.

19 Claims, 7 Drawing Sheets

(51) Int. Cl.
    *A24F 40/60*     (2020.01)
    *A24F 40/65*     (2020.01)
    *G06Q 20/32*     (2012.01)

(56) References Cited

U.S. PATENT DOCUMENTS

| | | | |
|---|---|---|---|
| 2017/0103595 A1* | 4/2017 | Taylor | G06K 7/10881 |
| 2018/0286207 A1 | 10/2018 | Baker et al. | |
| 2019/0350257 A1* | 11/2019 | Sur | H05B 1/0227 |
| 2020/0093180 A1 | 3/2020 | Qiu | |
| 2020/0146361 A1* | 5/2020 | Silver | G16H 40/67 |
| 2020/0352249 A1* | 11/2020 | Achtien | A61M 15/0066 |
| 2021/0089946 A1* | 3/2021 | Pegors | G06N 5/04 |

FOREIGN PATENT DOCUMENTS

| | | | |
|---|---|---|---|
| WO | 2018171337 A1 | 9/2018 |
| WO | 2019129866 A1 | 7/2019 |
| WO | 2019186158 A1 | 10/2019 |

OTHER PUBLICATIONS

Search Report dated Jan. 22, 2025 from the Office Action for Chinese Application No. 202080088606.9 Issued Feb. 5, 2025, pp. 1-3.

* cited by examiner

500

| User name | Associated E-cigs | Payment details | Other info |
|---|---|---|---|
| Jon | E-cig ID1<br>E-cig ID2 | Mastercard<br>1234-XXXX | e.g flavour preferences |
| Tim | E-cig ID3<br>E-cig ID4<br>E-cig ID5 | Visa<br>5679-XXXX | e.g home address |
| Julie | E-cig ID6 | Visa<br>4321-XXXX | e.g email ID |
| Darren | E-cig ID7 | Amex<br>9087-XXXX | e.g vaping history |

*FIG. 5*

METHOD OF AUTHENTIFICATION OF A CONSUMABLE FOR UES WITH AN AEROSOL- GENERATING DEVICE

CROSS-REFERENCE TO RELATED APPLICATIONS

The present application is a national phase entry under 35 U.S.C. § 371 of International Application No. PCT/EP2020/086560, filed Dec. 16, 2020, published in English, which claims priority to European Application No. 19218335.8 filed Dec. 19, 2019, the disclosures of which are incorporated herein by reference.

FIELD OF INVENTION

The present invention generally relates to an aerosol-generating device such as e-cigarettes. In particular, it relates to an e-cigarette capable of making contactless payments.

BACKGROUND

Aerosol-generating devices such as e-cigarettes are becoming increasingly popular. With this, there is also an increase in demand for making such devices smarter and increasing their usability. However, introducing additional features on these devices may make them more complex and costly. In addition, enabling some of these features may require storing sensitive information on the device which could lead to potential security issues.

In some aerosol generating devices, a precursor used to generate the aerosol is stored in a removable consumable item such as a cartridge. Thus, when the precursor is consumed, the cartridge can be easily removed and replaced. Some unauthorized entities produce counterfeit cartridge for use with the aerosol-generating devices. Such cartridges may be of inferior quality and potentially damaging to the device and the user. It may not be obvious to the user if the cartridge is genuine or not. Thus, the user may unknowingly use a fake cartridge with their device. This is clearly undesirable for both the consumer and the manufacturer of such aerosol generating devices and genuine cartridges.

It is an object of the present invention to address the issues mentioned above.

SUMMARY OF THE INVENTION

According to an aspect of the present invention, there is provided A method of authenticating a consumable for use with an aerosol generating device, the method comprising initiating a communication between the aerosol generating device and a first entity to obtain the consumable from the first entity for use with the aerosol generating device, the aerosol generating device being associated with a device ID and the consumable being associated with a consumable ID; sending the device ID and the consumable ID from the first entity to a second entity, wherein the second entity is configured to associate and store the device ID with the consumable ID; and verifying use of the consumable with the aerosol generating device.

Advantageously, using the above method, it is possible to use the aerosol generating device such as an e-cig to buy a cartridge for use from a merchant. It is also possible to verify the use of the bought cartridge with the e-cig with the help of the merchant and a remote server. In this way, fake cartridges can be identified and interests of both the manufacturer and the user can be safeguarded.

Preferably, use of the consumable with the aerosol generating device is verified based on the association between the device ID and the consumable ID.

Preferably, the method also includes storing the consumable ID of the consumable that is used with the aerosol generating device at the aerosol generating device regardless whether the consumable is authenticated or not; and sending the consumable ID stored at the aerosol generating device together with the device ID from the aerosol generating device to the second entity.

Preferably, the method also includes comparing the device ID and the consumable ID received from the aerosol generating device to the association between the device ID and the consumable ID received from the first entity to determine whether use of the consumable with the aerosol generating device is verified or not; and sending a notification to the aerosol generating device if use of the consumable with the aerosol generating device is not verified.

Preferably, the method also includes sending the consumable ID by the first entity to the aerosol generating device after the consumable is successfully obtained.

Preferably, the method also includes storing the consumable ID in the aerosol generating device, and unlocking the aerosol generating device for use based on the stored consumable ID.

Preferably, the method also includes scanning the consumable ID to compare with the consumable ID received from the first entity and stored at the aerosol generating device; and deleting the consumable ID from the aerosol generating device if the comparison is a match.

Preferably, the method also includes sending an unlocking command by the first entity to the aerosol generating device after the consumable is successfully obtained, wherein the unlocking command comprises information indicating a number of items in a pack of the consumable to be allowed for use with the aerosol generating device.

Preferably, the unlocking command further comprises information indicating a time period of usage associated with the consumable.

Preferably, the method also includes automatically locking the aerosol generating device when the number of items in the pack of the consumable are used or when the time period of usage associated with the consumable is expired.

Preferably, the method also includes initiating a contactless payment using a contactless payment interface to provide an identity of the aerosol generating device to the first entity when a security condition is satisfied.

Preferably, the method also includes communicating wirelessly with a personal computing device, wherein the security condition comprises detecting the personal computing device to be in vicinity of the aerosol-generating device.

According to another aspect of the invention, there is provided an aerosol generating device comprising: a processor to execute the steps in the above method; a memory for storing the device ID and/or the consumable ID; and a communication unit configured to communicate with at least one of the first entity, the second entity, and the personal computing device.

According to another aspect of the invention, there is provided a remote server comprising a memory; a communication interface configured to receive a first device ID for an aerosol generating device and a first consumable ID for a consumable from a first entity, and a second device ID for the aerosol generating device and a second consumable ID for the consumable from a personal computing device; and a processor configured to compare the first device ID and the first consumable ID with the second device ID and the second consumable ID respectively to verify the authenticity of the consumable.

According to another aspect of the invention, there is provided a computer-readable medium comprising software instructions which, when executed by a processor, implement the method as described above.

BRIEF DESCRIPTION OF THE DRAWINGS

Embodiments of the invention are now described, by way of example, with reference to the drawings, in which:

FIG. 5 is an exemplary database of users of various aerosol-generating devices;

DETAILED DESCRIPTION

Next, various aspects of the invention will be described. Note that the same or similar portions are denoted with the same or similar reference signs in the descriptions of the drawings below. Note that, the drawings are schematic and a ratio of each size is different from a real one. Therefore, specific sizes and the like should be judged in consideration of the following descriptions. Needless to say, portions of which relationship and ratios of mutual sizes are different between the mutual drawings are included.

Figure 1:
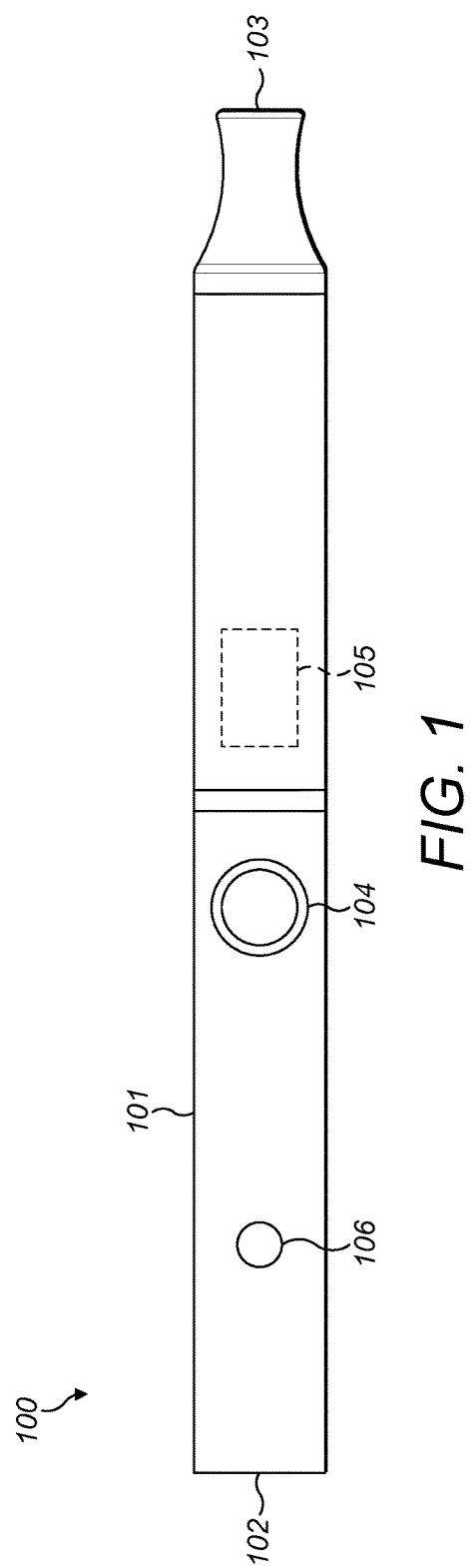
FIG. 1 is an exemplary aerosol generating device with increased usability according to an aspect of the invention.

FIG. 1 shows a non-combustion-type aerosol-generating device 100, which is an instrument for inhaling a flavor and/or a stimulant without combustion. The device 100 has a rod-like shape with a main body 101 extending from a non-mouthpiece end 102 to a mouthpiece end 103. An air channel or path is defined in the main body 101 between the opposite ends 102, 103. The device 100 in the present example is an aerosol-generating device or a vaping device, and is referred to as e-cig 100 hereinafter. The e-cig 100 works by vaporizing or heating an aerosol source contained inside the e-cig 100 to release a flavor or a stimulant for a user to inhale through the mouthpiece end 103. The aerosol source in the e-cig 100 preferably comprises a removable consumable item such as tobacco rod, which the user may place within a cavity provided in the main body 101 at which heating may be provided by a heating element. A temperature sensor may also be provided at the cavity in the main body 101. The construction and operation of such a device is well known in the art and will be understood by a skilled person.

The e-cig 100 also includes an activation switch 104 that may be configured to perform at least one of a turn-on and a turn-off of a power source of the e-cig 100. The activation switch 104 may be a push button or a touch button disposed at any convenient location on the surface of the main body 101 of the e-cig 100. The switch 104 may also include a shake-sensor, a touch screen, a biometric sensor, a voice recognition unit or any other unit to recognise an input from the user.

The e-cig 100 also comprises a near-field communication (NFC) module 105, in the form of a chip or a tag, preferably placed inside the main body 101. The e-cig 100 may have more than one NFC tags 105, e.g. one placed on the main body 101 of the e-cig 100 and another on the catridge.

The e-cig 100 preferably also includes a visual indicator 106 placed on the surface of the main body 101. The visual indicator 106 may be in the form of an elongate strip of adjacent LEDs. Equally, any indicator or feedback method may be used, such as other light sources, a mechanical indicator, an LCD display, a sound emitter, a vibration unit, or any other configuration of LEDs, for example a circular array of LEDs. The LED strip 106 may comprise a plurality of strips of LEDs, wherein each strip may optionally be of a different colour of LED. The LED strip 106 can indicate any status of the device such as indicating that scanning for a Bluetooth-enabled device is being undertaken, that the batter has a low charge level, that an error has occurred, or that a wireless link cannot be found. Additionally, it can indicate the progress of a continuous operation such as pre-heating progress, scanning progress or charging progress. This may be achieved by turning on or off one or more LEDs, turning on or off a particular colour of LEDs or any such convenient selection of LEDs which conveniently inform the user of the status of the device. Remaining available resources of the device such as remaining battery charge or remaining aerosol forming substrate may be communicated to the user using the LED strip 106 by proportionately or otherwise correspondingly turning on or off a number of consecutive LEDs in the strip. The progress of any operation as described above may also be indicated in this manner. Alternatively or in addition, information may be conveyed to the user by altering the brightness of one or more LEDs, or by blinking the LEDs at a predetermined frequency.

Figure 2:
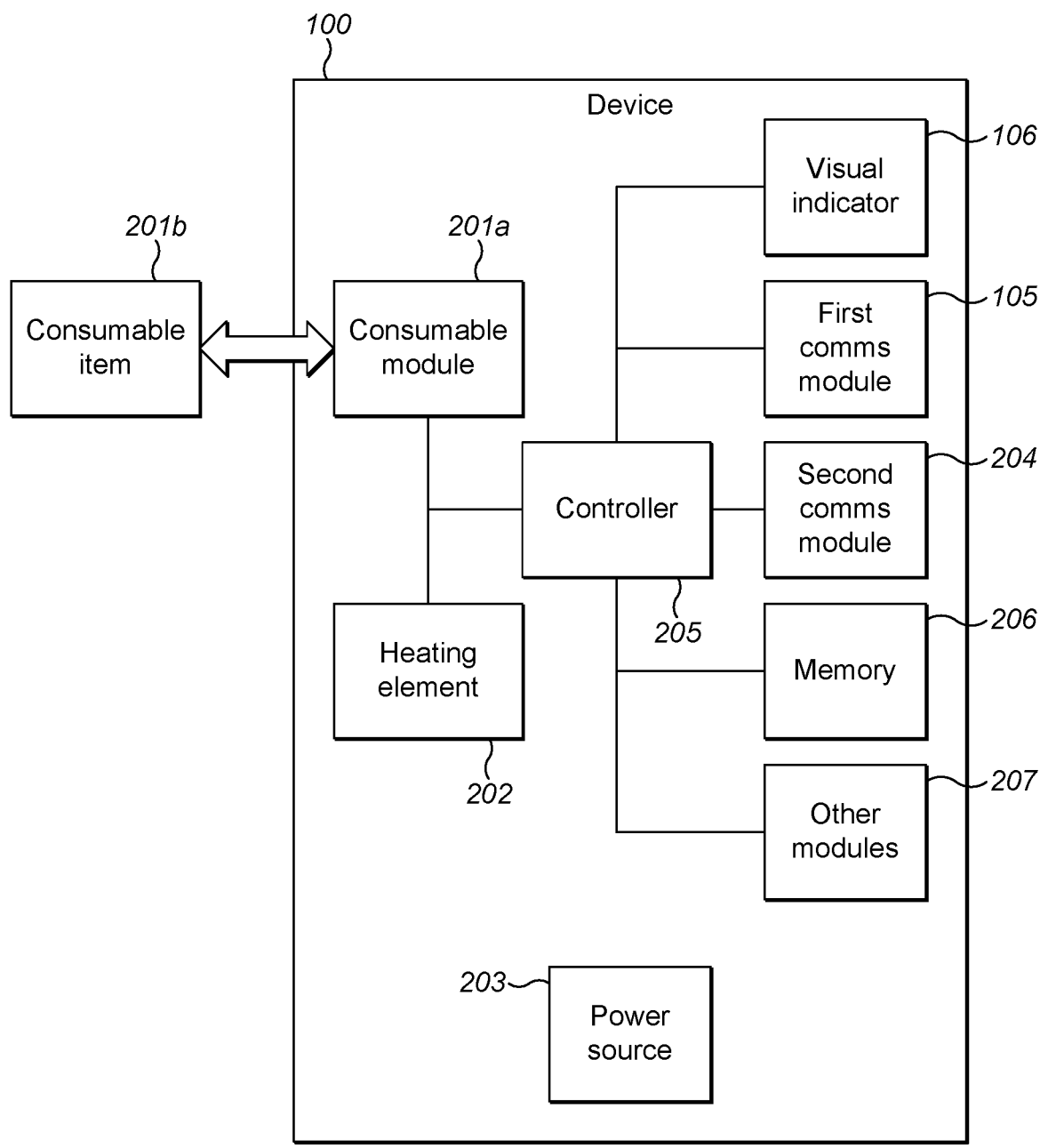
FIG. 2 is a block diagram showing various modules in the device of FIG. 1.

FIG. 2 shows various components of the e-cig or device 100. The e-cig 100 comprises the consumable module 201a and a heating element 202 that heats to vaporize a consumable item 201b or cartridge placed in the consumable module 201a to release aerosol containing the flavor and/or stimulant for the user to inhale. In the present example, the consumable item 201b is a substance containing nicotine. The consumable item 201b may be in the form of solid or liquid and is heated by the heating element 202 to release the aerosol without combustion. The heating element 202 may be powered by a power source 203. The power source 203 is, for example, a lithium ion battery. The power source 203 supplies an electric power necessary for an action of the e-cig 100. For example, the power source 203 supplies the electric power to all other components or modules included in the e-cig 100. In an alternative example, the heating element is arranged in the consumable that is in the form of liquid.

The consumable item 201b may include an additional flavor source (not shown) provided on the side of the mouthpiece end 103 beyond the consumable module 201a holding the consumable item 201b, and generates a flavor to be inhaled by the user together with the aerosol generated from the consumable item 201b. Examples of the flavor source that can be used include shredded tobacco, a formed body including a tobacco raw material formed granular, a formed body including the tobacco raw material formed to have a sheet in shape. The flavor source may include a plant, such as mint or a herb, except tobacco. A flavor, such as menthol, may be added to the flavor source.

The e-cig 100 also includes a first communications module, which may comprise a contactless payment interface. In the present example, the contactless payment interface is the NFC module 105, as described above. Through the NFC module 105, the e-cig 100 is able to communicate with any other NFC-enabled device. Preferably, the NFC module 105 in the present invention is used to make contactless payments using the e-cig 100 to buy a product or a service from a merchant. This is described in detail further below with reference to FIGS. 3 and 4.

The e-cig 100 further includes a second communications module, which is preferably a Bluetooth module 204. The Bluetooth module 204, typically in the form of a chip or tag, can be placed anywhere in the main body 101 of the e-cig 100. Using the Bluetooth module 204, the e-cig 100 is able to establish a short range and secure communication with another Bluetooth-enabled device such as a smartphone. This is described in detail further below with reference to FIGS. 3 and 4. It is to be noted that the second communications module 204 may also be able to perform communications using one of the known long-range protocols such as Wi-Fi, 3G, 4G, 5G, etc.

The e-cig 100 also includes a controller 205 that is configured to control various modules or components in the e-cig. The controller 205 may also process the data captured by the NFC module 105 and the Bluetooth module 204.

The e-cig 100 may include a memory 206 and other modules 207 such as additional visual light emitting element, a display, and a sound emitter. The memory 206 is configured to store device ID, consumable ID, and data received from various sensors as well as vaping usage history and information such as user settings and preferences. The visual light-emitting element such as an LED may be disposed at the tip of the non-mouthpiece end 102. Such an LED may exhibit a first light-emitting mode in a puff state where the aerosol has been being inhaled and a second light-emitting mode different from the first light-emitting mode, in a non-puff state where the aerosol has not been inhaled. Here, the light-emitting mode is defined by a combination of parameters, such as the amount of light of the light-emitting element, the number of light-emitting elements in a lighting state, a color of the light-emitting element, and a cycle in which lighting of the light-emitting element and non-lighting of the light-emitting element repeat. The different light-emitting mode means that at least any one of the above parameters is different.

Figure 3:
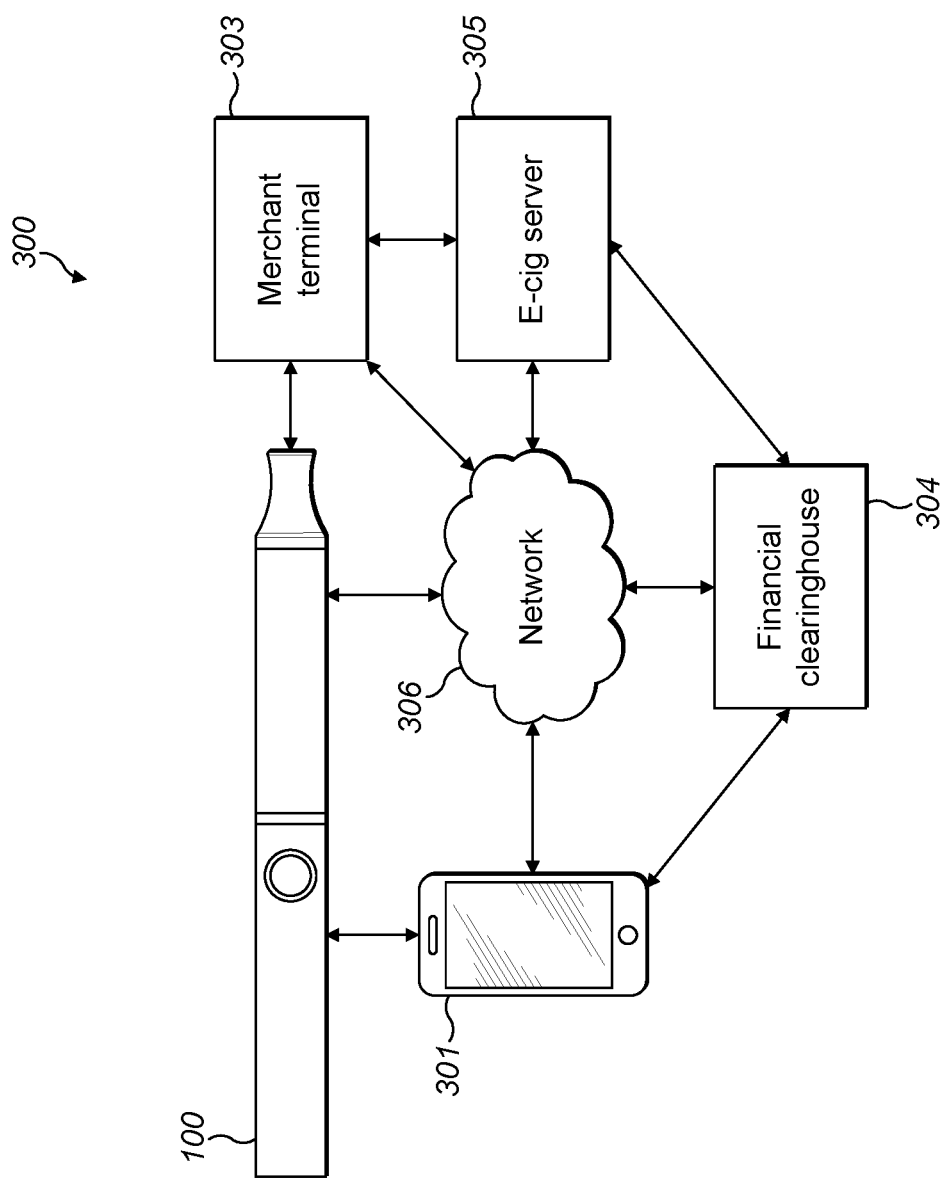
FIG. 3 is a schematic of a system in which the device of FIG. 1 communicates with other entities in the system.

FIG. 3 shows a system 300 including the e-cig 100 and various other inter-connected entities. The system 300 includes a personal computing device 301, which may be a smartphone, tablet, laptop, or a wearable gadget owned by the user of the e-cig 100. The e-cig 100 is connectable to the device 301 via the Bluetooth module 205. For the sake of simplicity, the personal computing device 301 is referred to as smartphone 301 hereinafter. To connect the e-cig 100 to the smartphone 301, the user preferably presses the switch 104 on the e-cig 100 for a set period or predetermined number of times. This activates the Bluetooth module 205, which then scans for a Bluetooth signal from a nearby device. If the Bluetooth interface on the smartphone 301 is turned on and in discoverable mode, the e-cig 100 finds the smartphone 301 and requests the smartphone 301 to connect or pair with it. When the user of the smartphone 301 accepts the request from the e-cig 100, both devices are paired. Alternatively, this pairing operation can be initiated or requested on the smartphone 301 and the user operates the e-cig 100 to accept and finish the pairing between the e-cig 100 and the smartphone 301. The e-cig 100 preferably stores the device ID such as MAC address of the smartphone 301 in the memory 206 to be able to automatically connect to it whenever the smartphone 301 is within the Bluetooth range. The e-cig 100 may periodically check the Bluetooth connection with the smartphone 301. The smartphone 301 may run an application (App) through which the user can monitor and control the functions of the e-cig 100.

The system 300 further includes a merchant terminal 303, which may be an NFC-enabled Point of Sale (POS) terminal in a merchant outlet or placed on a vending machine. The merchant terminal 303 has a merchant payment interface such as an NFC tag similar to the NFC module 105 in the e-cig 100 through which it can communicate with the e-cig 100. As is known in the art, for NFC communication, the devices must be in close proximity of each other to be able to communicate. In the present invention, the user uses the e-cig 100 to pay for a product or a service at a merchant outlet or a vending machine. To do so, the user brings the e-cig 100 sufficiently close to the merchant terminal 303 and may press the switch 104 or shake the e-cig 100 to enable the NFC module 105 to communicate with the NFC tag on the merchant terminal 303. The e-cig 100 receives data such as transaction amount, merchant ID, etc. from the merchant terminal 303 and passes this data to the smartphone 301 via the established Bluetooth connection between the two devices. The controller 205 may facilitate such transfer of data.

The merchant terminal 303 may also comprise means for reading a unique device identifier or device ID associated with the e-cig 100 and a cartridge unique identifier or consumable ID associated with the cartridge 201b.

The system 300 also comprises a financial clearinghouse 304, which is essentially an issuer server of a bank with which the user holds an account. The financial clearinghouse 304 is able to verify the details of the user passed on to it by the merchant terminal 303 and approve the payment. For the sake of simplicity, the financial clearinghouse 304 is referred to as issuer 304 hereinafter.

The system 300 further comprises an e-cig server 305, communicably connected to the merchant terminal 303. The e-cig server 305 is a remote server operated and managed by the manufacturer of the e-cig 100 or by a trusted third-party authorized by the manufacturer of the e-cig 100. The e-cig server 305 may also be communicably connected to the e-cig 100 and the smartphone 301. The e-cig server 305 can be accessible by the user via the e-cig 100 and/or the smartphone 301 connected to the e-cig 100 as well as the merchant terminal 303. In some cases, the e-cig server 305 can determine adjustable operational settings for the e-cig 100 for which a service has been required. In some embodiments, the e-cig server 305 can determine emission composition of the aerosol using for example only the brand and/or model of the e-cig 100 or any other device characteristic such for example its identifier. In this case, the e-cig server 305 is for example able to access to the emission test report relative to this brand and/or model of the e-cig 100 or any other device characteristic. In some embodiments, the e-cig server 305 is able to store device and cartridge information as explained below. The e-cig server 305 may also store user's personal data, for example the user's ID, user identifier, age, photo, location, preferences, list of authorized users, etc.

Various entities in the system 300 are preferably connected over a network 306. The network 306 may be a public network such as the internet. Some communications in the system 300 may occur over a secure private link, such as between the e-cig server 305 and the issuer 304.

As used herein, device ID is a device unique identifier which may refer to a number or a series of alphanumeric characters or any other form of identification, making it possible to identify each aerosol generating device such as the e-cig 100, preferably in a unique way. It can for example be attributed to each aerosol generating device while its manufacturing or purchasing. In some cases, it can correspond to the product serial number.

As used herein, the term consumable ID is a cartridge unique identifier which may be a number or a series of alphanumeric characters or any other form of identification, making it possible to identify and authenticate each cartridge such as the cartridge 201b in a unique way. It can for example be attributed to each cartridge while its manufacturing or purchasing. In some cases, it can correspond to the product serial number. In some embodiments, the consumable ID makes it possible to determine the nature of the precursor and/or its composition stored into the cartridge.

It will be understood by the skilled person that other entities such as directory server, tokenization platform, merchant bank, etc. may also be present in the system 300. Moreover, the entities in the system 300 may communicate with each other over wired channels or wirelessly. The system 300 also complies with known security protocols and standards well established in online banking systems.

Figure 4:
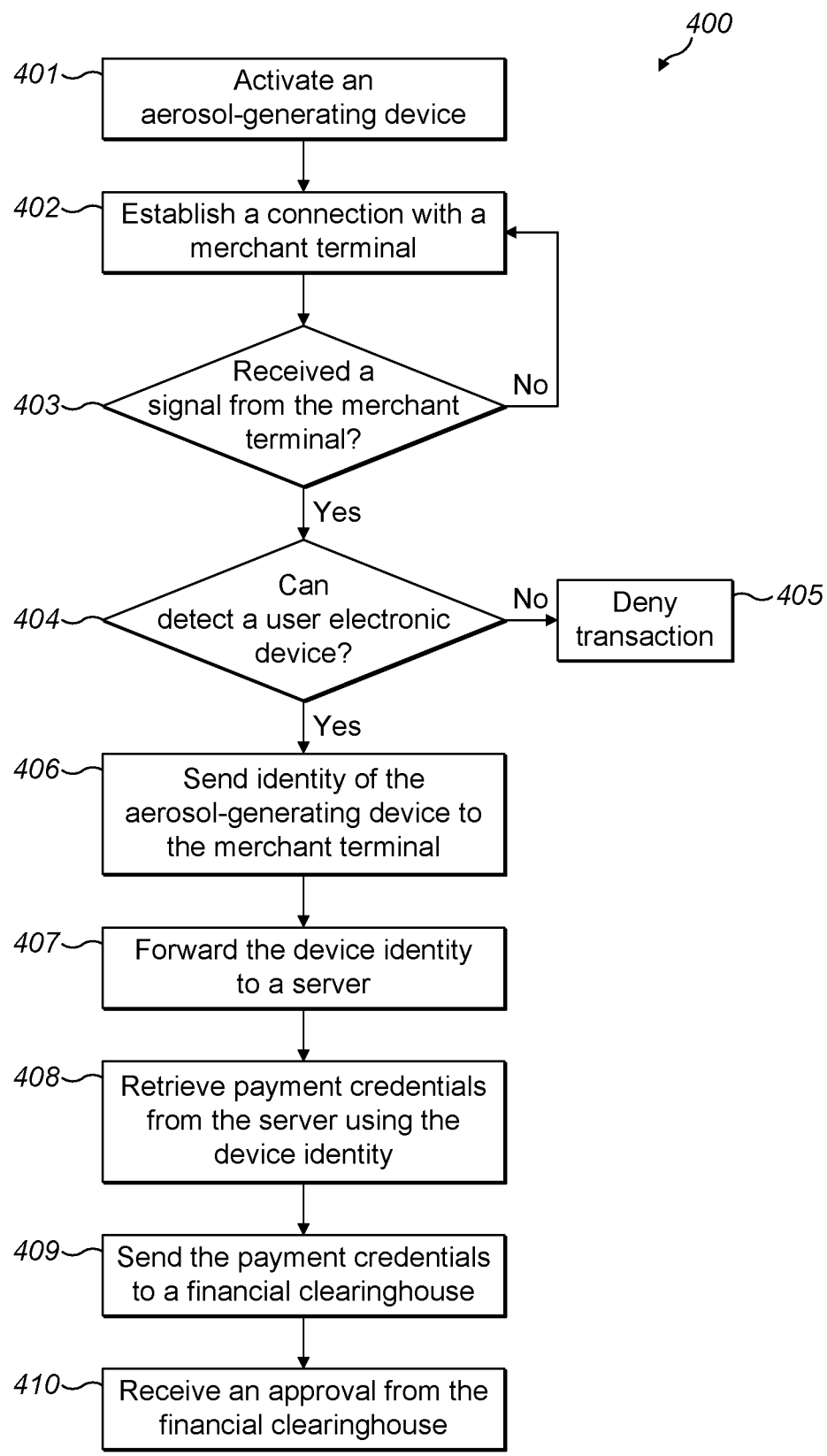
FIG. 4 is a flow diagram of a method performed by the device of FIG. 1 according to an aspect of the invention.

FIG. 4 shows a method of making a contactless payment using the aerosol-generating device or e-cig 100. At step 601, an aerosol-generating device is activated. In the present example, the user presses the switch 104 once to turn on the e-cig 100. The visual indicator 106 may light up to indicate the activation of the e-cig 100. At this point, the e-cig 100 is preferably not activated for vaping (e.g. by turning on the heater) but just for turning on the NFC module 105 and the Bluetooth module 204. The e-cig 100 may instead be activated by shaking the device or via voice command. In addition, the user may be authenticated using biometrics such as by scanning his or her fingerprints with a fingerprint sensor disposed on the switch 104.

At step 402, establish a wireless communication (e.g., NFC communication) with a merchant terminal. This can be achieved, e.g., when the device is brought in close proximity of a contactless payment interface. In the present example, the user requests a merchant (e.g. till assistant in a shop) or makes a selection at a vending machine (e.g. ticket machine at a station) to initiate a payment process using the merchant terminal 303. For example, the user may demand and select a specific flavor for a consumable compatible with the e-cig 100 at an e-cig merchant outlet. The user then brings the e-cig 100 in close proximity of the merchant terminal 303 to establish an NFC connection.

At step 403, it is determined if a signal is received from the payment interface. In the present example, under normal circumstances, the NFC module 105 in the e-cig 100 detects the NFC tag in the merchant terminal 303 and vice-versa. The merchant terminal 303 sends a signal to the e-cig 100 seeking payment credentials of the user from the e-cig 100 via the established NFC connection. If the signal is not received by the e-cig 100, the user may need to bring the device further closer to the merchant terminal 602 to establish the connection.

At step 404, it is determined if the aerosol-generating device can detect a user electronic device. In the present example, upon receiving the signal from the merchant terminal 303, the controller 205 scans for Bluetooth-enabled devices in its vicinity via the Bluetooth module 204 to determine if the smartphone 301 is in the vicinity of the e-cig 100. If the smartphone 301 was previously authenticated and connected to the e-cig 100, the e-cig 100 matches the MAC address of the smartphone 301 stored in the memory 206. The e-cig 100 may also quickly establish a connection with the smartphone 301. Establishing the connection or communication with the smartphone 301 is however optional. As long as the e-cig 100 can detect the previously authenticated smartphone 301 in its vicinity, the process proceeds to step 606. However, if the e-cig 100 is unable to detect the smartphone 301 to authenticate the user, it proceeds to step 605. At step 405, the transaction is denied. In the present example, failing to detect the smartphone 301, the e-cig 100 is unable to authenticate the user. The merchant terminal 303 waits for a set amount of time (typically a few seconds) to receive the payment credentials, after which it aborts the transaction.

At step 406, an identity of the aerosol-generating device is sent to the merchant terminal. In the present example, upon detecting the smartphone 301, the e-cig 100 sends its device ID to the merchant terminal 303. The controller 205 may facilitate sending the device ID via the NFC module 105 to the merchant terminal 303.

At step 407, the device identity is forwarded to a server. In the present example, after receiving the device ID from the e-cig 100, the merchant terminal 303 sends the device ID to the e-cig server 305. The e-cig server 100 stores user profile of the user including user name, age, registered vaping devices (one or more) with their respective device IDs, registered payment method (e.g., credit card info), etc.

At step 408, payment credentials of the user are retrieved from the server using the device identity. In the present example, the e-cig server 305 maintains a database of all users registered with it and securely stores their user profiles including payment credentials. The e-cig server 305 searches for the device ID of the associated user in the database and retrieves the user's payment credentials such as a registered credit card info associated with the device ID. An example of such a database 500 is shown in FIG. 5.

In the database 500, a profile of each user registered with the e-cig server 305 is stored. In each user profile, information such as user name, associated e-cig device IDs, payment credentials, vaping history, home address, etc. is stored. For example, second row of the database 500 stores profile of a user called Tim who has three e-cigs IDs associated with his profile, has a Visa credit card linked to his profile and has his home address stored in the database. The e-cig server 305 may allow the user to edit or add to the profile stored in the database 500 after authenticating the user. It is to be understood that the fields shown in the database 500 are non-limiting and there may be many more fields in the database which would be known to a skilled person.

At step 409, the payment credentials are sent to a financial clearinghouse. In the present example, the e-cig server 305 sends the retrieved payment credentials of the user back to the merchant terminal 303 for processing the payment and then the merchant terminal 303 transfers the received payment credentials to the issuer 304. Alternatively, the e-cig server 305 sends the retrieved payment credentials of the user directly to the issuer 304 for processing the payment. The e-cig server 305 preferably sends the payment credentials over a secure channel to the issuer 304 to minimize the risk of any online fraud.

At step 410, an approval is received from the financial clearinghouse. In the present example, the issuer 304 verifies the payment credentials received from the e-cig server 305 in order to approve the payment. If the issuer 304 is unsure of the payment, it may authenticate the user using one or more known methods such as sending a one-time password (OTP) to the smartphone 301 or asking the user to confirm the transaction via a bank app on the smartphone 301. If the issuer 304 is confident about the transaction and the user has sufficient funds in the account, it approves the payment and sends a confirmation to the e-cig server 305, which in turn sends a confirmation signal to the merchant terminal 303. On receiving the confirmation, the merchant terminal 303 may display a payment approved message on its screen for the merchant. The user may also receive an acknowledgement directly from the issuer 304 via the smartphone 301. This may be in the form of an update on the bank app or a text on the smartphone 301 from the issuer 304.

However, if the verification fails or the user account does not have sufficient funds, the issuer 304 declines the transaction and it is also communicated to the merchant terminal 303 in the same way as above.

In the method described above, the e-cig 100 is used as a contactless payment device to initiate a payment process with the merchant terminal 303. However, the e-cig 100 uses the user's smartphone 301 to authenticate the user and sends the device ID to the merchant terminal to further process the payment via the e-cig server 305. The e-cig server 100 then retrieves the payment credentials of the user using the device ID and completes the payment process with the issuer 304. The e-cig 100 is unable to make the payment without detecting the smartphone 301, thus making the payment process more secure. Moreover, as the e-cig 100 does not store the payment credentials of the user, there is no issue of data security with using the e-cig 100 for making payments. By acting as intermediate payment initiating device between the merchant terminal 303 and the smartphone 301, the aerosol-generating device 100 of the present invention offers the convenience and increased usability without adding complexity or compromising the security in online transactions.

In an alternative embodiment, the smartphone 301 stores the payment credentials of the users and enables processing of payment between the merchant terminal 303 and the issuer 304. In such an embodiment, the e-cig 100 connects with the merchant terminal 303 using NFC and sends a received signal from the merchant terminal 303 to the smartphone 301. The e-cig 100 receives payment credentials of the user from the smartphone 301 using Bluetooth connection and sends the received payment credentials to the merchant terminal 303 using NFC. The merchant terminal 303 then sends the payment credentials of the issuer 304 for processing the payment. The payment is therefore made using the smartphone 301 but via the e-cig 100 as an intermediary for added security.

Figure 6:
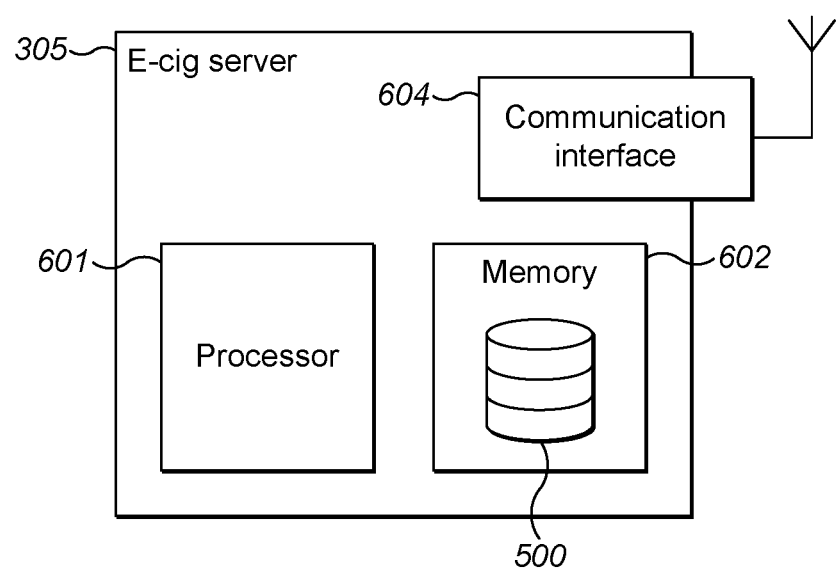
FIG. 6 is a block diagram of a remote server in the system of FIG. 3.

FIG. 6 shows a block diagram of various components in the e-cig server 305. The e-cig server 305 comprises a processor 301 which may include one or more processing units to execute various instructions such as associating device ID and consumable ID, and a memory 602 storing such instructions and other information. The memory 602 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

The memory 602 includes the database 500 storing device and user information such as user ID, device ID, consumable ID, etc. The database 500 can be integrated in the remote server 305, or it can be external to remote server 305 and located remotely. For example, the remote server 305 may include one or more hard disk drives as a storage device.

The processor 601 is operatively coupled to a communication interface 604 such that the remote server 305 is capable of communicating with other devices of the system 300 such as the smartphone 301 and the merchant terminal 303. For example, the communication interface 604 may receive communications from another member of the system 300 over the network 306, depending on the function of the e-cig server 305 within the context of the system 300.

Figure 7:
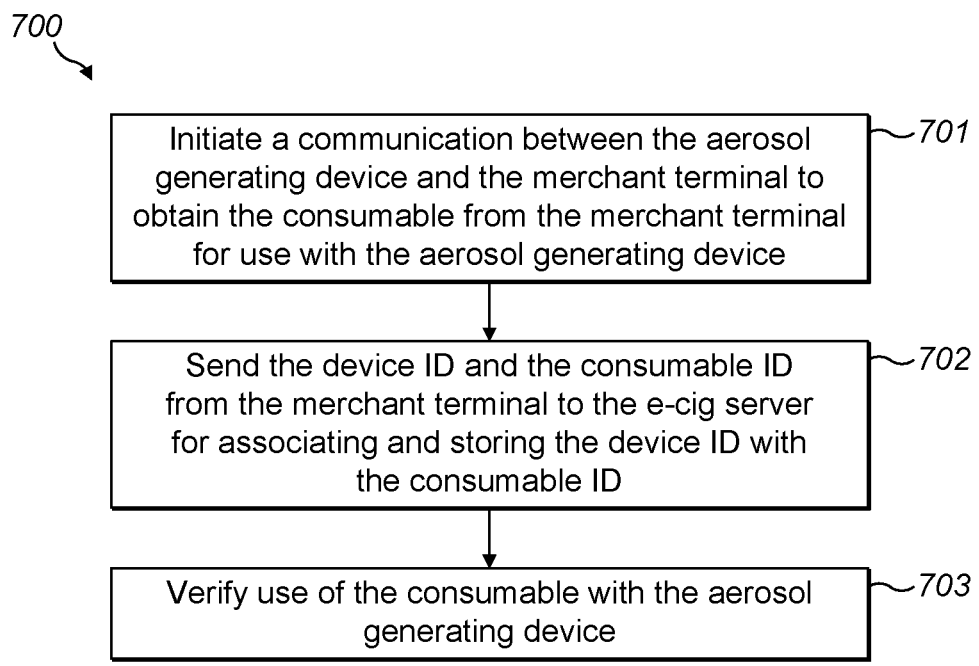
FIG. 7 is a flow diagram of a method implemented in the system of FIG. 3.

FIG. 7 shows a flow diagram 700 for a method according to another aspect of the invention as implemented in the system 300. It is to be noted that not all steps are shown in the diagram 600 and the steps may not be necessarily performed in the order shown.

At step 701, a consumable item, associated with a consumable ID, is obtained from a first entity for use with an aerosol generating device, associated with a device ID. In the present example, the user uses a consumable item such as the cartridge 201*b* with the e-cig 100. When the cartridge being used with the e-cig 100 is depleted or a spare cartridge is needed, the user may purchase a new cartridge from a merchant authorized to sell such cartridges. The user may walk into a merchant store and use the e-cig 100 as a payment device to buy a new cartridge such as the cartridge 201*b*, as explained above. When the user brings the e-cig 100 in close proximity of the merchant terminal 303, NFC reader in the merchant terminal 303 engages or communicates with the NFC module in the e-cig 100 to initiate a payment using contactless payment technology. It is to be noted that the merchant terminal 303 may be a point of sale (PoS) terminal in a merchant store or an automated vending machine located in any public space.

The e-cig 100 may further comprise a device identification element configured to provide a device identifier (device ID) to the merchant terminal 303. The identification element may be integrated into the e-cig 100 or disposed on an exterior surface of its body. In the case where the identification element is integrated into the e-cig 100, this element can be formed by a chip comprising a memory storing the device ID and able to communicate with an external device, such as the merchant terminal 303, to transmit this identifier using a known short-range communication protocol, like for example NFC. In the case where the identification element is disposed on an exterior surface of its body, it can be formed by a label comprising for example a QR code or a barcode encrypting the device ID. In a variant, the device identifier is written on the label using for example alphanumeric characters.

The cartridge 201*b* may also comprise a cartridge identification element configured to provide a cartridge unique identifier or the consumable ID. Like the device identification element for the e-cig 100, the cartridge identification element can be formed by a chip comprising a memory storing the consumable ID to be able to communicate with an external device to transmit this identifier using a known short-range communication protocol, like for example NFC. According to other embodiments, the cartridge identification element can be formed by a label comprising for example a QR code or a barcode encrypting the consumable ID. In a variant, the consumable ID is written on the label using for example alphanumeric characters.

The consumable ID provided by the cartridge identification element may be read using identification means. These identification means include, depending on the nature of the element, a photo/video camera and/or an RF reader and/or an optic reader and/or mechanic/electronic contact surfaces. In some cases, such identification means can be integrated into the e-cig 100 such that the consumable ID can be read by the consumable module 201a. In some other embodiments, the identification means can be integrated into a mobile device, such as the smartphone 301, associated with the e-cig 100, or any other external device such as the merchant terminal 303.

At step 702, the device ID and the consumable ID are sent from the first entity to a second entity which associates and stores the device ID with the consumable ID. In the present example, upon using the e-cig 100 to buy the cartridge 201b, the merchant terminal 303 reads the device ID from the e-cig 100 as well as the consumable ID from the cartridge 201b. If the payment is not made using the e-cig 100, the merchant may still ask the user to scan the e-cig 100 at the merchant terminal 303 or another scan terminal to read the device ID. Once the transaction is confirmed, the merchant terminal 303 sends the device ID and the consumable ID to the e-cig server 305. The e-cig server 305 then associates the device ID with the consumable ID and stores them together in the database 500. It is to be noted that the consumable or cartridge 201b may be bought within a package comprising a number of individual cartridges or sticks.

At step 703, the consumable ID is verified to authenticate the consumable. In the present example, the cartridge 201b is verified for use with the e-cig 100, i.e. to ensure that the cartridge 201b is not counterfeit and fit for consumption. This may be done in a number of ways as explained below.

In a first embodiment, the user purchases the cartridge 201b within a package with a number of cartridges and a consumable ID or pack ID is provided on the package, for example, in the form of a barcode or QR code. Alternatively, the consumable ID or the pack ID may be sent directly to the e-cig 100 by the merchant terminal 303. This is then stored by the e-cig 100. Later, when the user needs to use the bought cartridge 201b with the e-cig 100, the consumable ID is read by the e-cig 100 to determine if the cartridge 201b is authentic, and uses it to activate or unlock the e-cig 100 for use. Once data has been read, the consumable ID stored on the e-cig 100 may deleted or made invalid so that it can only be used once. In this way an unauthorised party is blocked from subsequently using the pack to store consumables that are not necessarily authorized or safe, reducing the possibility of counterfeiting.

In a second embodiment, the merchant terminal 303 sends an unlocking command containing information indicating the number of cartridges in the pack or the time period of usage for cartridges. The e-cig 100 has an internal counter included in the other modules 207 to monitor the vaping consumption and the controller 205 locks the device upon determining depletion of the cartridge 201b. For example, if the user bought 2 packs (each containing 30 individual cartridges), an unlocking command is sent to the e-cig 100 allowing it to authorize 60 cartridges for use the e-cig 100. After all those 60 cartridges are consumed, the e-cig 100 automatically locks the device. Advantageously, this prevents an unauthorized user to use the e-cig 100, unless they possess the device at the time of purchasing the cartridges. This also helps preventing the use of counterfeit consumables, since only the number of packs bought from an authorized merchant is allowed to be used with the e-cig 100.

In a third embodiment, no information or unlocking command is sent back to e-cig 100. At the time of purchase, the device ID and the consumable ID are sent only to the e-cig server 305 to store the association in the database 500. Each time the user unlocks the device with a consumable ID or pack ID as described above, the e-cig 100 records and stores the consumable ID or the pack ID internally in the memory 206 regardless of authentication of the consumable. Subsequently, when the user connects the e-cig 100 to the smartphone 301, information about the device, consumed cartridges or packs, as well as about puff records and vaping history, is uploaded to the e-cig server 305. The e-cig server 305 then uses the uploaded device and consumable information to perform a comparison with the association information stored in the database 500 at the time of purchase. In other words, the device ID and consumable ID stored on the e-cig 100 is compared to the device ID and the consumable ID stored on the e-cig server 305. The comparison can be used to identify any unauthorised pack (e.g., stolen from the merchant terminal 303, counterfeit packs with counterfeit ID), an unauthorised device (e.g., stolen e-cig), or for regulation purposes. In this case, the e-cig server 305 preferably sends a warning message to the owner of the e-cig 100 that a non-authentic consumable has been used with the e-cig 100.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

The processing steps described herein carried out by the main control unit, or controller, may be stored in a non-transitory computer-readable medium, or storage, associated with the main control unit. A computer-readable medium can include non-volatile media and volatile media. Volatile media can include semiconductor memories and dynamic memories, amongst others. Non-volatile media can include optical disks and magnetic disks, amongst others.

It will be readily understood to the skilled person that the preceding embodiments in the foregoing description are not limiting; features of each embodiment may be incorporated into the other embodiments as appropriate.

The invention claimed is:

1. A method of authenticating a consumable for use with an aerosol generating device, the method comprising:
    initiating a communication between the aerosol generating device and a first entity to obtain the consumable from the first entity for use with the aerosol generating device, the first entity being a merchant terminal, the aerosol generating device being associated with a device ID and the consumable being associated with a consumable ID;
    sending the device ID and the consumable ID from the first entity to a second entity, wherein the second entity is configured to associate and store the device ID with the consumable ID; and
    verifying use of the consumable with the aerosol generating device.

2. The method of claim 1, wherein use of the consumable with the aerosol generating device is verified based on an association between the device ID and the consumable ID.

3. The method of claim 2, further comprising:
    storing the consumable ID of the consumable that is used with the aerosol generating device at the aerosol generating device regardless of whether the consumable is authenticated or not; and
    sending the consumable ID stored at the aerosol generating device together with the device ID from the aerosol generating device to the second entity.

4. The method of claim 3, further comprising:
    comparing the device ID and the consumable ID received from the aerosol generating device to the association between the device ID and the consumable ID received from the first entity to determine whether use of the consumable with the aerosol generating device is verified or not.

5. The method of claim 4, further comprising:
sending a notification to the aerosol generating device when use of the consumable with the aerosol generating device is not verified.

6. The method of claim 1, further comprising sending the consumable ID by the first entity to the aerosol generating device after the consumable is obtained.

7. The method of claim 6, further comprising storing the consumable ID in the aerosol generating device, and unlocking the aerosol generating device for use based on the stored consumable ID.

8. The method of claim 7, further comprising scanning the consumable ID to compare with the consumable ID received from the first entity and stored at the aerosol generating device.

9. The method of claim 8, further comprising deleting the consumable ID from the aerosol generating device when a comparison of the scanned consumable ID with the consumable ID received from the first entity and stored at the aerosol generating device is a match.

10. The method of claim 1, further comprising sending an unlocking command by the first entity to the aerosol generating device after the consumable is obtained, wherein the unlocking command comprises information indicating a number of items in a pack of the consumable to be allowed for use with the aerosol generating device.

11. The method of claim 10, wherein the unlocking command further comprises information indicating a time period of usage associated with the consumable.

12. The method of claim 10, further comprising automatically locking the aerosol generating device when the number of items in the pack of the consumable are used.

13. The method of claim 11, further comprising automatically locking the aerosol generating device when the time period of usage associated with the consumable is expired.

14. The method of claim 1, further comprising initiating a contactless payment using a contactless payment interface to provide an identity of the aerosol generating device to the first entity when a security condition is satisfied.

15. The method of claim 14, further comprising communicating wirelessly with a personal computing device, wherein the security condition comprises detecting the personal computing device to be in a vicinity of the aerosol-generating device.

16. The method of claim 1, wherein the merchant terminal is an NFC-enabled point of sale terminal at a merchant store or outlet or at a vending machine.

17. The method of claim 1, wherein the step of initiating includes initiating a communication between the aerosol generating device and the first entity to purchase the consumable from the first entity for use with the aerosol generating device.

18. An aerosol generating device comprising:
a processor to execute the steps in the method of claim 15;
a memory for storing the device ID and/or the consumable ID; and
a communication unit configured to communicate with at least one of the first entity, the second entity, and the personal computing device.

19. A non-transitory computer-readable medium comprising software instructions which, when executed by a processor, cause the processor to carry out the method according to claim 1.

* * * * *